(No Model.)

E. FOERSTER.
INSERTIBLE DIAMOND SAW TOOTH.

No. 273,054. Patented Feb. 27, 1883.

WITNESSES:
Jos. N. Rosenbaum.
Otto Risch

INVENTOR
Emanuel Foerster
BY Paul Goepel
ATTORNEY

UNITED STATES PATENT OFFICE.

EMANUEL FOERSTER, OF NEW YORK, N. Y.

INSERTIBLE DIAMOND SAW-TOOTH.

SPECIFICATION forming part of Letters Patent No. 273,054, dated February 27, 1883.

Application filed December 30, 1882. (No model.)

*To all whom it may concern:*

Be it known that I, EMANUEL FOERSTER, of the city, county, and State of New York, have invented certain new and useful Improvements in Insertible Teeth for Stone-Cutting Saws, of which the following is a specification.

The teeth of stone-cutting diamond saws have heretofore been inserted into a recess of the saw-blade by means of rivets. The teeth were liable to get loose, owing to the strain on the rivets, so that they have to be riveted again to the blade from time to time.

The object of this invention is to overcome this objection and to secure the diamond-carrying teeth in such a manner that they cannot get loose; and the invention consists in locking the tooth into the recess of the saw-blade by a tapering wedge-key and by a transverse rivet, which latter engages the thicker end of the key, and also a recess of the saw-tooth.

Figure 1:
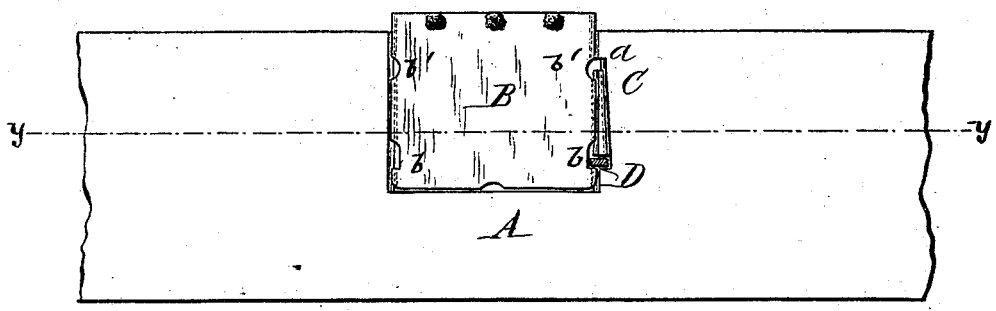
Figure 2:
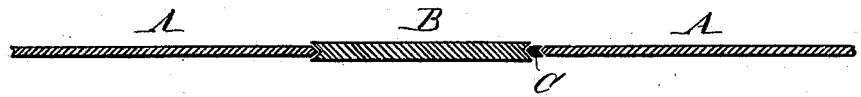

In the accompanying drawings, Figure 1 represents a top view, and Fig. 2 a vertical transverse section on line $y$ $y$, Fig. 1, of my improved insertible tooth for stone-cutting diamond saws.

Similar letters of reference indicate corresponding parts.

In the drawings, A represents a saw-blade, and B an insertible saw-tooth, which latter carries the diamonds for cutting the stone to be sawed. The tooth B is provided with grooved ends, which are fitted to the beveled side edges of the recess of the saw-blade. One side edge of the recess is further provided with an inclined recess, $a$, between the beveled edge of which and the tooth B a wedge-shaped key, C, is inserted, which key is grooved at one side and beveled at the other, so as to fit the edges of the recess and tooth, respectively.

When the saw-tooth B is inserted in the recess of the saw-blade and the key C driven home in the recess $a$, between the key and the blade, a rivet, D, is driven transversely across the thicker end of the key, it engaging also a recess, $b$, of the tooth, whereby the saw-tooth is fully set back into its recess, and also rigidly locked in position therein.

Whenever it is desired to remove the tooth and replace it by a new one the rivet D is removed and the key C loosened by driving a wedge-shaped tool into a recess, $b'$, of the tooth B and into the recess $a$ in front of the thinner end of the key, whereby the latter is driven back, so that the tooth can be removed. Both ends of the tooth B are provided with recesses $b$ $b'$, which admits the reversing of the tooth in the blade, which is of advantage for securing the even wear of the cutting-diamonds at both sides of the tooth.

Having thus described my invention, I claim as new and desire to secure by Letters Patent—

The combination of a recessed saw-blade, A, an insertible tooth, B, having end recesses, $b$ $b'$, a tapering key, C, inserted between the tooth B and an inclined side recess of the saw-blade, and transverse rivet D, engaging both the key and one of the end recesses of the tooth, substantially as specified.

In testimony that I claim the foregoing as my invention I have signed my name in presence of two subscribing witnesses.

EMANUEL FOERSTER.

Witnesses:
CARL KARP,
SIDNEY MANN.